United States Patent [19]

Franz et al.

[11] 4,454,203

[45] Jun. 12, 1984

[54] PRESSING PLASTIC WITH EXTENSIBLE COATING

[75] Inventors: Helmut Franz; James H. Hanlon, both of Pittsburgh; Lloyd G. Shick, Natrona Heights, all of Pa.

[73] Assignee: PPG Industries, Inc., Pittsburgh, Pa.

[21] Appl. No.: 210,099

[22] Filed: Nov. 24, 1980

[51] Int. Cl.[3] .............................................. B32B 27/08

[52] U.S. Cl. .................................... 428/520; 427/164; 427/290; 427/370; 427/393.5; 428/212; 428/522

[58] Field of Search ....................... 428/520, 522, 212; 427/164, 290, 393.5, 369, 370, 355

[56] References Cited

U.S. PATENT DOCUMENTS

| | | | |
|---|---|---|---|
| 3,485,662 | 12/1969 | Metevia | 427/140 |
| 3,562,383 | 2/1971 | Ayres | 428/192 X |
| 3,607,615 | 9/1971 | Hatakeyama | 428/520 |
| 3,632,841 | 1/1972 | Fortin | 428/332 |
| 3,668,053 | 6/1972 | Ayres | 428/192 X |
| 4,142,018 | 2/1979 | Ozawa et al. | 425/520 |
| 4,293,603 | 10/1981 | Chaffey | 428/86 |
| 4,332,861 | 1/1982 | Franz et al. | 428/520 |

FOREIGN PATENT DOCUMENTS

| | | | |
|---|---|---|---|
| 2619922 | 11/1976 | Fed. Rep. of Germany | 428/520 |
| 2827332 | 1/1980 | Fed. Rep. of Germany | 427/161 |

*Primary Examiner*—George F. Lesmes
*Assistant Examiner*—E. Rollins Buffalow
*Attorney, Agent, or Firm*—Donna L. Seidel

[57] ABSTRACT

A method for making a plastic billet particularly suitable for compression stretching by coating the plastic surface with a more extensible polymer film is disclosed.

3 Claims, No Drawings

PRESSING PLASTIC WITH EXTENSIBLE COATING

FIELD OF THE INVENTION

The present invention relates generally to the art of pressing plastics, and more particularly to the art of treating the surface of an acrylic substrate to improve its physical and chemical properties.

The Prior Art

U.S. Pat. No. 3,632,841 to Fortin discloses a method for stretching acrylic by compressing an acrylic blank, preheated substantially isothermally to its softening temperature, between a pair of polished plates coated with lubricant. When the desired thickness is reached, the stretched acrylic is cooled to below its softening temperature before the compressive force is removed. Lubricant films less than 0.005 inch thick are generally satisfactory, with the preferred lubricant being polytetrafluoroethylene.

U.S. Application Ser. No. 192,760, filed on Oct. 1, 1980, by Helmut Franz, entitled "Acrylic Polymer Surface Passivation", discloses a method for reducing the chemical reactivity of an acrylic surface by chemisorption or absorption of a nonreactive species such as carboxylated fluorosurfactant at the acrylic surface.

U.S. Pat. No. 4,332,861 to Franz et al entitled "Plastic Surface Treatment", discloses coating roughened surface portions of acrylic articles with an ethylacrylate polymer film to provide a smooth, durable finish.

SUMMARY OF THE INVENTION

The present invention involves coating the surface of a rigid plastic substrate with a compatible polymeric film which is more extensible than the substrate. In subsequent pressing operations such as press bending and compression stretching, the more extensible film provides for improved plastic flow of the laterally expanding substrate, and also provides improved optical quality for the resulting plastic article.

DESCRIPTION OF THE PREFERRED EMBODIMENT

Acrylic compression stretching techniques such as described in U.S. Pat. No. 3,632,841 to Fortin involve treating the pressing plate surfaces which contact the acrylic surface with a lubricant such as polytetrafluoroethylene, while the technique described in U.S. Application Ser. No. 192,760 filed on Oct. 1, 1980 entitled "Acrylic Polymer Surface Passivation" teaches the adsorption or chemisorption at the acrylic surface of a nonreactive species such as carboxylated fluorosurfactant to lower the reactivity of and impart lubricity to the acrylic surface.

Compression stretching techniques similar to those disclosed in the aforementioned references, as well as conventional press bending techniques, are utilized in preferred embodiments of the present invention. However, in accordance with the present invention, a rigid plastic billet is first coated with a more extensible polymeric film, that is, one which improves the plastic flow of the laterally expanding plastic billet. The coating also improves the optical quality of the finished article.

In a preferred embodiment of the present invention, acrylic billets are coated with more extensible acrylate films. Acrylic compositions which may be utilized in accordance with the present invention include both modified and unmodified polymerization products of acrylic acid. Preferred acrylic compositions include modified polymerization products of methyl methacrylate, available as Plexiglas ® acrylic stock from Rohm and Haas, Philadelphia, Pa.

The acrylic substrate is treated prior to pressing by coating the acrylic surface with a film of a more extensible polymer, preferably an alkyl acrylate. An alkyl acrylate which is more extensible than the acrylic substrate, that is one which exhibits better plastic flow under stress, is an acrylate with longer chain pendant or backbone alkyl groups. For example, when the substrate is methyl methacrylate, the coating may be ethyl methacrylate, ethyl ethacrylate, propyl methacrylate, propyl ethacrylate, and so on. Ethyl acrylates, particularly ethyl methacrylate, are preferred. The acrylate film is preferably formed by applying to the acrylic surface a solution of the alkyl acrylate and curing. In a preferred embodiment of the present invention, a toluene based solution of ethyl methacrylate is applied to the surface of the acrylic billet. The solvent is evaporated, forming a clear film of polyethylmethacrylate on the acrylic surface. No high temperature curing is necessary, merely ambient temperature drying. A preferred coating composition is INCRALAC clear lacquer, a toluene based solution of ethyl methacrylate available from Stan Chem., Inc. of East Berlin, Conn. The coating composition may be applied by any conventional technique such as dipping, brushing, flowing, etc. A preferred coating technique is spraying INCRALAC clear lacquer onto the acrylic surface and drying at ambient temperature. The lacquer may be applied as supplied, about 20 percent solids, or may be diluted with additional solvent, preferably toluene.

The coated acrylic blank is then subjected to a conventional compression stretching operation. Typically, the acrylic blank is preheated, then placed under pressure in a hydraulic press to stretch the acrylic blank to the desired final thickness. The stretched blank is held under pressure while the temperature is reduced. The amount of pressure required to press-stretch the acrylic billet to the desired final thickness, as well as the degree of retention of the original perimeter configuration, indicates the facility of plastic flow. Coating with ethyl acrylate in accordance with the present invention substantially reduces the pressure required to press acrylic billets from $\frac{3}{4}$ inch to $\frac{1}{4}$ inch thickness. In addition, square billets coated in accordance with the present invention retain their corners to a visibly greater degree than untreated billets.

The present invention will be further understood from the description of specific examples which follow.

EXAMPLE I

Samples of PLEXIGLAS ® acrylic stock $\frac{3}{4}$ inch (1.9 centimeters ) thick are coated with ethyl acrylate by spraying on a solution of INCRALAC clear lacquer and drying at ambient temperature. The coated acrylic blanks are preheated at 270° F. (132°C.) for 30 minutes. The coated blanks are then placed in a hydraulic press and stretched under compression. The coated surfaces flow very well, requiring only 900 to 1200 pounds per square inch pressure to stretch the blanks to a final thickness of $\frac{1}{4}$ inch (about 6 millimeters), compared with 2000 to 2500 psi required for untreated acrylic blanks pressed under the same conditions.

EXAMPLE II

Square acrylic blanks are coated with ethyl acrylate and press-stretched as in the previous example except that particles of polymethylmethacrylate, polytetrafluoroethylene or polyethylene are present at the interface of the acrylic surface and the pressing plate during the press-stretching. These samples exhibit even better plastic flow than those of the previous example, requiring only 650 to 800 pounds per square inch pressure to reach the final thickness, and remaining nearly square.

The above examples are offered to illustrate the present invention, which includes various modifications such as coating other rigid plastics with more extensible polymer films to facilitate plastic flow in compression stretching, press bending and other processing techniques. The scope of the present invention is defined by the following claims.

We claim:

1. In a method of processing a polymethylmethacrylate substrate comprising a step of pressing, the improvement which comprises coating the exterior surface of the substrate prior to pressing with a film of a more extensible longer chain alkylacrylate.

2. The method according to claim 1, wherein the acrylic surface is coated with a film of polyethylmethacrylate prior to compression-stretching.

3. The method according to claim 2, wherein a solution of ethyl methacrylate is applied to the acrylic surface and the solvent is evaporated to form a polyethylmethacrylate film.

* * * * *